(No Model.)
P. GENDRON.
VEHICLE WHEEL.
No. 382,356. Patented May 8, 1888.
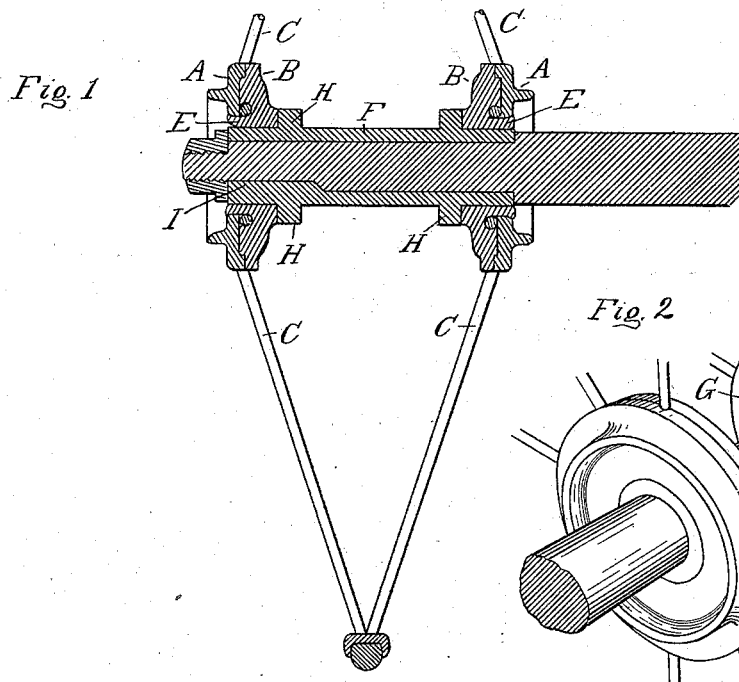
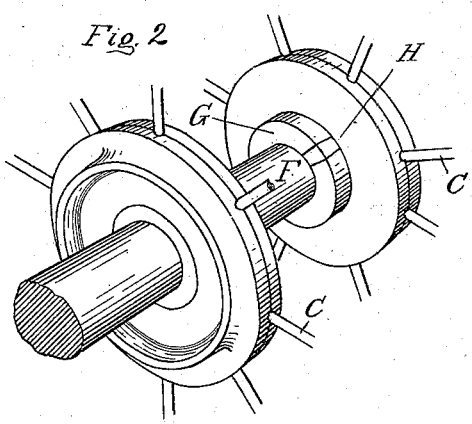
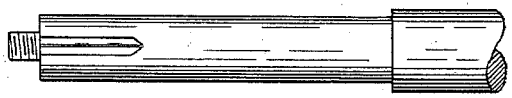
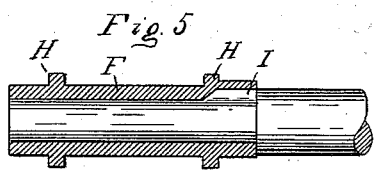
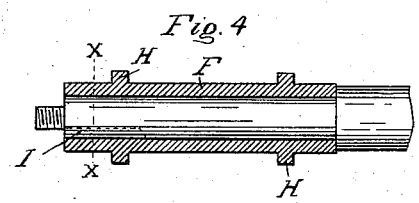
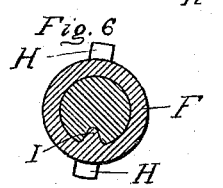
Witnesses:
P. M. Hulbert.
James R. Whittemore.
Inventor:
Peter Gendron,
By Thos. S. Sprague & Son.
Att'y.

UNITED STATES PATENT OFFICE.

PETER GENDRON, OF TOLEDO, OHIO.

VEHICLE-WHEEL.

SPECIFICATION forming part of Letters Patent No. 382,356, dated May 8, 1888.

Application filed November 19, 1887. Serial No. 255,638. (No model.)

*To all whom it may concern:*

Be it known that I, PETER GENDRON, a citizen of the United States, residing at Toledo, in the county of Lucas and State of Ohio, have invented certain new and useful Improvements in Vehicle-Wheels, of which the following is a specification, reference being had therein to the accompanying drawings.

This invention relates to new and useful improvements in the construction of iron wheels; and the object of the invention is more particularly to improve the construction of such iron wheels intended to be used as drive-wheels for velocipedes or other vehicles of a similar nature, and to which the power is applied through the medium of the axle, upon which the drive-wheel has to be made fast.

The means in ordinary use for making wheels of all kinds fast upon revolving shafts or axles have been found in practice to be unsatisfactory for this class of iron wheels, less on account of their nature than on account of the nature of the wheel. In the present state of the art, in the construction of velocipedes and like vehicles the wheels in general use are so-called "suspension-wheels," provided with alternately oppositely-inclined wire spokes secured to a hub which has to be made in several parts, and is therefore not as well adapted as solid hubs to be firmly and detachably secured to an axle by the usual means.

My invention consists in the peculiar construction of the hub of an iron wheel, whereby all the advantages of a solid hub are obtained in regard to the use of the wheel as a drive-wheel, and, further, in the specific means provided for detachably securing the wheel to its axle.

In the drawings which accompany the specification, Figure 1 is a vertical central cross-section through my improved wheel and the axle to which it is secured. Fig. 2 is a perspective view of the hub. Fig. 3 is a plan of the axle. Fig. 4 is a similar view of the axle with the skein in section. Fig. 5 is a similar view to Fig. 4, showing the modification of the device for securing the skein upon the axle; and Fig. 6 is a cross-section on line $x\ x$ in Fig. 4.

A and B are a pair of disks secured together, and between which the inner ends of the spokes C are clamped, there being two pairs of such disks for one wheel, the spokes being oppositely inclined to each other and secured at the outer end to the rim of the wheel.

The particular manner of securing the spokes between the disks A B and the means for securing these two disks A B together do not form any part of my present invention. The construction of the disks A B and the manner of securing them together and to the spokes (shown in the drawings) are the same as shown in the Letters Patent granted to me July 18, 1882, No. 261,222, and consist, substantially, of forming the spokes in pairs and securing them in suitable grooves formed in the inner face of the disks, which are then secured together by rivet-heading the flange E of the hub B, as shown.

F is a skein made integrally in one piece, and upon the opposite ends of which the disks A B are sleeved, as shown. The inner disk, B, I provide with the collar G, in which are formed one or more radial notches, and the skein F is provided correspondingly therewith with one or more radial lugs, H, adapted to engage into these notches, preferably by a slight wedge action, so as to prevent any lost motion between the parts in fitting them together. By the peculiar arrangement of the spokes, which are upon opposite sides of the central line, each pair of disks is firmly held in engagement with the lugs on the skein. To secure the skein upon the axle, I provide each skein with one or more forwardly-projecting ribs, I, preferably of triangular cross-section, as shown, and in the axle I cut a corresponding recess, so that when the parts are engaged, as shown, the wheel is firmly secured upon the axle. Instead of forming the rib I upon the inside of the skein, the modification shown in Fig. 5 may be employed, wherein the rib is formed upon the axle and the recess to receive it is formed in the skein, or both ways may be used jointly. By this means of securing the drive-wheel upon its shaft there is no screw, nut, or other part to be lost, as is the case in the usual means of securing wheels upon an axle, and the annoyance caused by such loss is therefore entirely avoided in my construction, while the wheel at the same time may be more readily detached.

The manner of securing the disks A B to the skein makes the whole hub practically solid as far as its function as a drive-wheel is concerned, while at the same time the parts may be very readily detached in case of necessary repairs to the wheel.

What I claim as my invention is—

1. In a wheel of the kind described, the combination, with two pairs of spoke-clamping disks, of notched collars formed upon the inner disk of each pair, and a skein, upon the outer ends of which these pairs of disks are sleeved and provided with lugs engaging into the notches of the collars of the disk, substantially as described.

2. The combination of two pairs of spoke-clamping disks, A B, a wheel of the kind described, notched collars G, formed upon the inner disk, and the skein F, upon the outer end of which the disks A B are sleeved, and provided with wedge-shaped lugs H, engaging into the notches of the collars G, substantially as described.

3. The combination of two pairs of spoke-clamping disks, A B, a wheel of the kind described, notched collars G, formed upon the inner disk, the skein F, upon the outer ends of which the disks A B are sleeved, lugs H, formed upon the skein and engaging into the notches of the collars G, one or more ribs, I, formed upon the inner face of the skein, and an axle provided with the corresponding recesses engaging with an inwardly-projecting rib of the skein, substantially as and for the purpose described.

In testimony whereof I affix my signature, in presence of two witnesses, this 21st day of September, 1887.

PETER GENDRON.

Witnesses:
JAMES WHITTEMORE,
P. M. HULBERT.